(12) United States Patent
Raschke et al.

(10) Patent No.: US 9,908,267 B2
(45) Date of Patent: Mar. 6, 2018

(54) METHOD FOR TEMPERATURE CONTROL OF A SHAPING TOOL

(71) Applicant: ENGEL AUSTRIA GmbH, Schwertberg (AT)

(72) Inventors: Florian Raschke, Ohlsdorf (AT); Georg Steinbichler, Rottenmann (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 707 days.

(21) Appl. No.: 14/169,521

(22) Filed: Jan. 31, 2014

(65) Prior Publication Data

US 2014/0217632 A1   Aug. 7, 2014

(30) Foreign Application Priority Data

Feb. 4, 2013   (AT) ........................................ 79/2013

(51) Int. Cl.
| | | |
|---|---|---|
| B29C 35/00 | (2006.01) | |
| B29C 45/72 | (2006.01) | |
| B29C 45/73 | (2006.01) | |
| B29C 45/78 | (2006.01) | |
| B29C 35/02 | (2006.01) | |

(52) U.S. Cl.
CPC ........ *B29C 35/007* (2013.01); *B29C 35/0294* (2013.01); *B29C 45/72* (2013.01); *B29C 45/73* (2013.01); *B29C 45/7306* (2013.01); *B29C 45/78* (2013.01); *B29C 2945/76006* (2013.01); *B29C 2945/76056* (2013.01); *B29C 2945/76304* (2013.01); *B29C 2945/76531* (2013.01); *B29C 2945/76545* (2013.01); *B29C 2945/76605* (2013.01)

(58) Field of Classification Search
CPC .................................................... B29C 35/007
See application file for complete search history.

(56) References Cited

U.S. PATENT DOCUMENTS

2009/0174101 A1   7/2009  Johnson
2011/0269084 A1   11/2011  Ito

FOREIGN PATENT DOCUMENTS

| AT | 511 110 A4 | 9/2012 |
|---|---|---|
| AT | 12 805 U1 | 12/2012 |
| CN | 201007802 | 1/2008 |
| CN | 102275283 | 12/2011 |
| DE | 87 12 481.5 | 1/1988 |

(Continued)

OTHER PUBLICATIONS

Chinese Search Report dated Dec. 29, 2015 in corresponding Chinese Application No. 201410129543.3.

(Continued)

*Primary Examiner* — Larry Thrower
(74) *Attorney, Agent, or Firm* — Wenderoth, Lind & Ponack, L.L.P.

(57) ABSTRACT

Provided is a temperature control device having at least one temperature control branch connected to a feed, and a pump system including at least one pump for the delivery of temperature control medium in the feed. Additionally, the temperature control device is provided with at least one sensor by which at least one of the parameters from the group of temperature, through-flow amount and pressure can be detected, and a control or regulating device for regulating or controlling a delivery of the pump system, to which signals from the at least one sensor can be fed.

9 Claims, 3 Drawing Sheets

(56) References Cited

FOREIGN PATENT DOCUMENTS

| | | |
|---|---|---|
| DE | 203 04 841 U1 | 8/2003 |
| DE | 10 2004 006 162 | 10/2005 |
| EP | 1 775 097 A1 | 4/2007 |
| JP | S58-173610 | 10/1983 |
| JP | H05-345341 | 12/1993 |
| JP | 2000-257800 | 9/2000 |
| JP | 2008-246940 | 10/2008 |
| JP | 2012-206261 | 10/2012 |
| KR | 10-2008-0059874 | 7/2008 |

OTHER PUBLICATIONS

Austrian Search Report dated Aug. 19, 2013 in corresponding Austrian Application No. 79/2013.
European Search Report dated Apr. 2, 2014 in corresponding European Application No. 14 00 0263.
European Search Report dated Apr. 30, 2014 in corresponding European Application No. 14 00 0264.
Grundfos Vertrieb:"Grundfos Industrie—Immer cool bleiben", www.grunsfoss.com dated Jul. 2000, pp. 1-4, XP002722690 and English language abstract.
Grundfos A/S Denmark: "Grundfos Data Booklet-NB, NBE, NK, NKE, Speed controlled pumps", Nov. 18, 2008, XP002722691.
Tigasfi GmbH: "Datenblatt TriWV 905", Jun. 12, 2009, XP002722692 and English language abstract.

METHOD FOR TEMPERATURE CONTROL OF A SHAPING TOOL

BACKGROUND OF THE INVENTION

I. Field of the Invention

The present invention concerns a temperature control device for a shaping tool or components of a shaping working machine.

II. Description of the Related Art

The following discussion of the state of the art is implemented exemplary on the basis of an injection moulding machine as a special case of a shaping working machine and on the basis of an injection moulding tool of such an injection moulding machine as an example of a shaping tool of a general shaping working machine. The disclosure of the following application however is not limited to that specific case.

In the present application the expression temperature control is used to denote cooling or heating.

In the state of the art the at least one pump is operated at a constant delivery. Either the through-flow amount which is afforded by the delivery (delivery amount or pressure and so forth) and the hydraulic resistance of the at least one branch line is used, or throttles are used to achieve a desired lower through-flow amount.

Various disadvantages result therefrom:
a constantly high energy consumption,
a reduced service life for the pump system,
costs for reverse temperature control of the temperature control medium by virtue of an excessively high volume flow,
a higher level of susceptibility to leakage, and
unnecessarily high pressure in the temperature control system.

The object of the invention is to at least partially overcome the above-described disadvantages.

SUMMARY OF THE INVENTION

According to a first aspect of the invention the above-described object is attained by a temperature control device having at least one temperature control branch connected to a feed, and a pump system including at least one pump for the delivery of temperature control medium in the feed, characterised in that there is provided at least one sensor by which at least one of the parameters from the group of temperature, through-flow amount and pressure can be detected and that there is provided a control or regulating device for regulating or controlling a delivery of the pump system, to which signals from the at least one sensor can be fed.

According to a second aspect of the invention, the above-described object is attained by a method of temperature control of a shaping tool or component of a shaping working machine, wherein temperature control medium is conveyed through at least one temperature control branch by a pump system including at least one pump, characterised in that at least one of the parameters from the group of temperature, through-flow amount and pressure is detected and that the at least one parameter is fed to a control or regulating device.

The invention provides that the above-described throttling which is absolutely required in the state of the art can be reduced or even eliminated. As the energy consumption is proportional to the product of through-flow amount and pressure drop elimination of the throttling has a positive effect on energy consumption.

Advantageous embodiments of the invention are additionally defined below.

Preferably water (in gas or liquid form) or oil is provided as the temperature control medium. It is however also possible to use other fluids like for example carbon dioxide or nitrogen. The temperature control medium can be delivered continuously or in pulsed fashion.

Particularly preferably it is provided that the temperature control device is in the form of an accessory device for a shaping working machine and has one or more temperature control branches. The accessory device can either be arranged in free-standing relationship beside the shaping working machine or can be installed thereon.

Particularly preferably there are provided at least two temperature control branches which are preferably connected in parallel.

To make the regulation or control action as good as possible at least one sensor can be provided in each of the at least temperature control branches, by which sensor at least one of the parameters from the group consisting of temperature, through-flow amount, pressure, amount of heat, and temperature difference can be detected, wherein signals from the sensors can be fed to the control or regulating device.

In the simplest case regulation or control of the pump can be implemented by the pump being regulated or controlled by way of its rotary speed.

In the situation where the pump system includes more than one pump it may be advantageous for individual pumps of the pump system to be adapted to be shut down and/or switched on, alternatively or additionally to regulation or control of the pump or pumps. That affords a kind of step control or regulation.

For individual regulation of the through-flow amounts in the temperature control branches, at least one throttle device can be respectively provided therein. The throttle device can be adjustable for example manually or by the control or regulating device. The throttle device can be for example a through-flow valve, the through-flow capacity of which is steplessly adjustable.

Another aspect of the invention concerns a shaping working machine, in particular an injection moulding machine, a die casting machine or a pressing machine, having a temperature control device according to the invention.

A further aspect of the invention concerns an arrangement comprising at least two shaping working machines and a temperature control device according to the invention, wherein the shaping tools of the at least two shaping working machines can be temperature-controlled by the temperature control device in serial or parallel relationship.

As that is particularly energy-efficient it can preferably be provided that each temperature control branch is individually throttled, wherein at least one of the temperature control branches is at least substantially not throttled. The pump can run with the lowest possible energy consumption by virtue of adaptation of the delivery (delivery amount or pressure and so forth) to the through-flow requirement of that non-throttled temperature control branch.

The control or regulating device can be a component part of the injection moulding machine control, an external control, an accessory component or a central management computer system.

The pump system can be a component part of the injection moulding machine, an accessory device or a central media supply.

Further advantages and details of the invention will be apparent from the Figures and the related specific description.

DETAILED DESCRIPTION OF THE INVENTION

Figure 1:
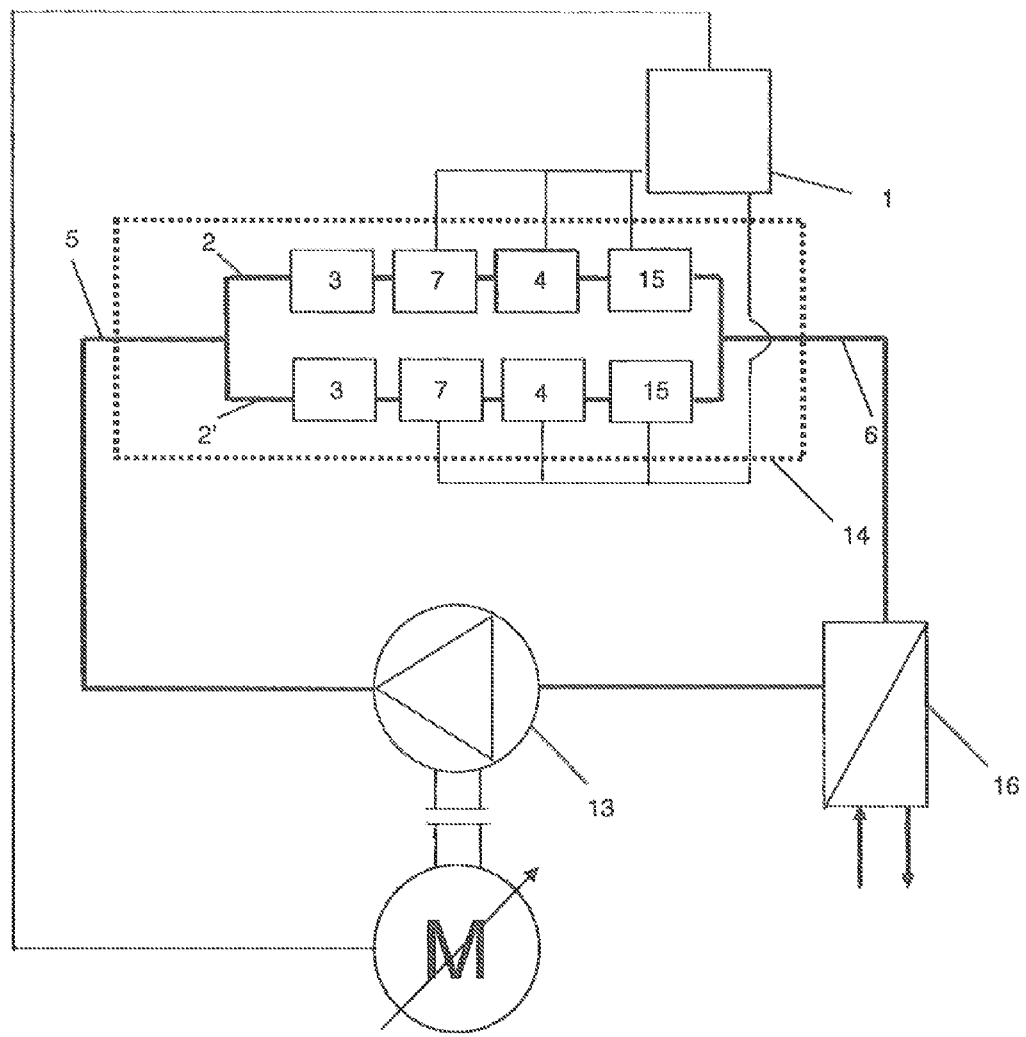
FIG. 1 shows a diagrammatic view of a temperature control device 14 according to the invention according to a first embodiment of the invention.

FIG. 1 shows a diagrammatic view of a temperature control device 14 according to the invention. It has two temperature control branches 2 which pass through a shaping or mould tool 3. Through-flow sensors 7, temperature sensors 4 and through-flow valves 15 are also present in the temperature control branches 2. It will be appreciated that the through-flow sensors 7 can also be in the form of a component together with the through-flow valves 15. In addition there is provided a regulating or control device 1—in this embodiment a regulating device. It is connected to the through-flow sensors 7, the temperature sensors 4 and the through-flow valves 15. The temperature sensors 4 represent an alternative to through-flow measurement.

The two temperature control branches 2 are respectively connected to the feed 5 and the return 6. A pump 13 delivers temperature control medium from the return 6 into the feed 5. In addition an optional heat exchanger 16 is arranged in the return 6. The pump 13 is also connected to the regulating device 1 for regulation purposes.

Figure 2:
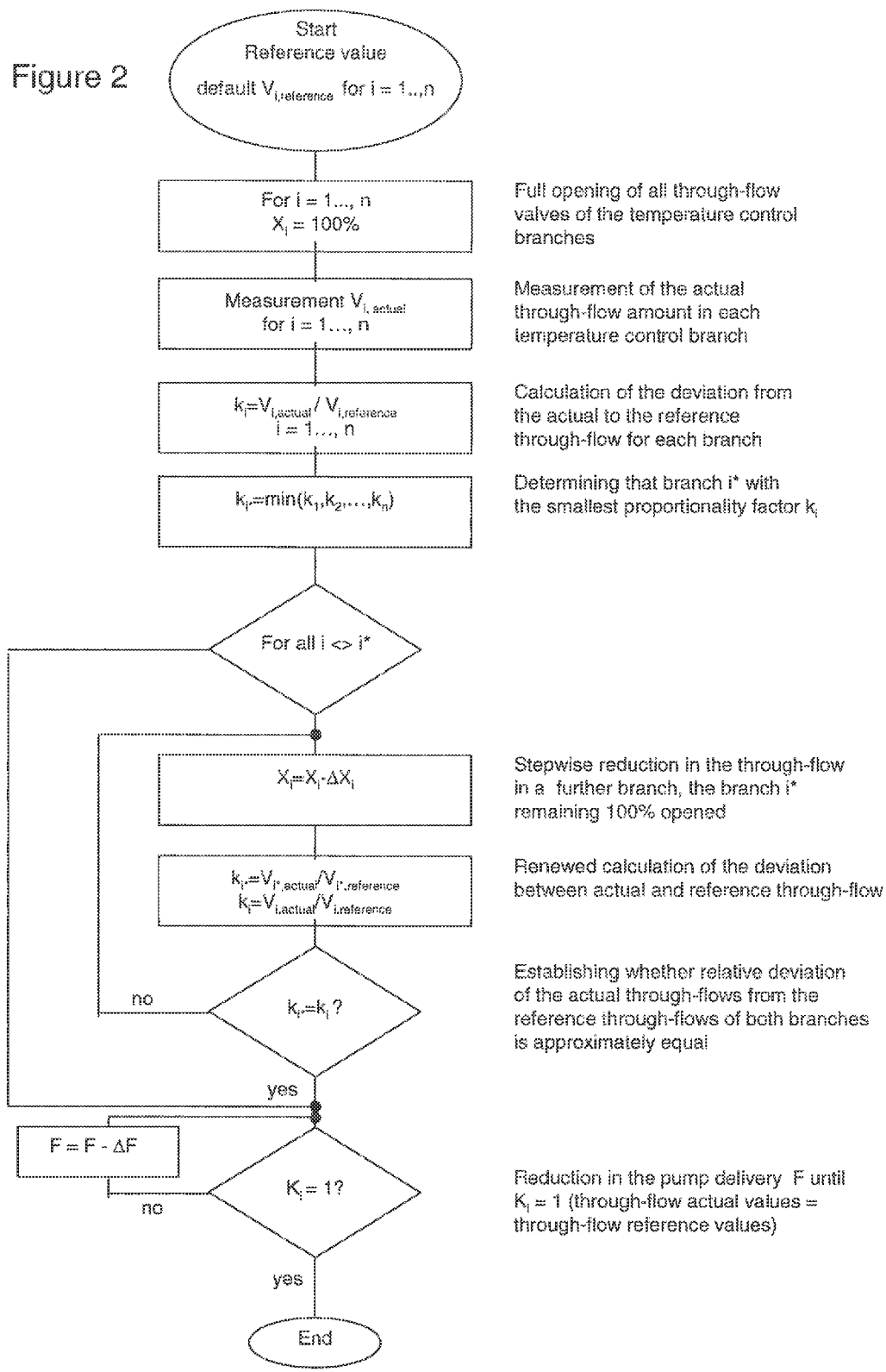
FIG. 2 shows a flow chart for illustrating a particularly preferred embodiment of a method according to the invention.

FIG. 2 shows a flow chart for illustrating a particularly preferred embodiment of a method according to the invention. Therein:

i denotes the serial number of the temperature control branches 2, n denotes the number of temperature control branches 2 used, $X_i$ denotes the degree of setting of the through-flow valve 15 in the temperature control branch i [%]

$V_i$ denotes the volume flow in the temperature control circuit i,

F denotes the pump system delivery flow.

That temperature control branch i* which at least approximately remains 100% open can be displayed to a user as a branch which is determining in respect of the overall system ("bottleneck"). In that way the user has the option of reducing in specifically targeted fashion the hydraulic resistance of that temperature control branch 2 for example by the removal of quick-action couplings or by reducing hose lengths. In that way the delivery flow of the pump 13 can be further reduced with simultaneous opening of the through-flow valves 15 of the further temperature control branches 2.

Figure 3:
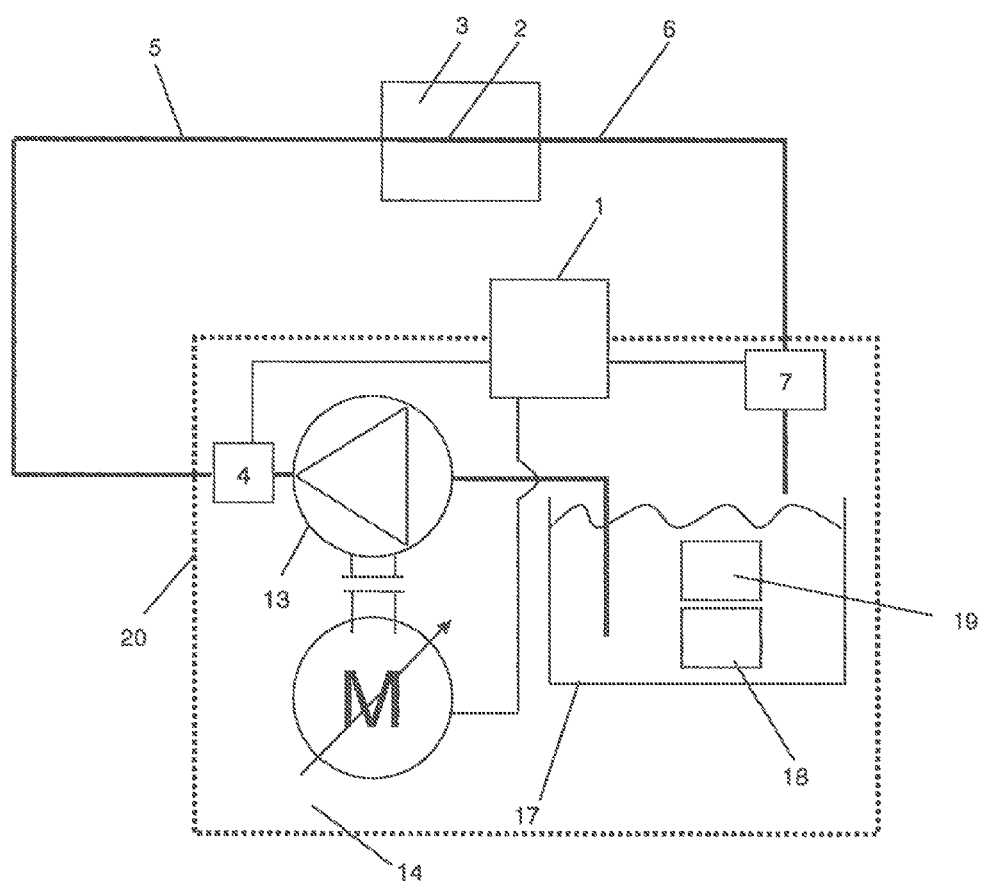
FIG. 3 shows a diagrammatic view of a temperature control device 14 according to the invention according to a second embodiment of the invention.

Unlike FIG. 1, FIG. 3 has only one temperature control branch 2. The temperature control device 14 is in the form of an accessory device. The following are arranged in a common housing 20:
pump 13
through-flow sensor 7
tank 17 for temperature control medium
heating means 18 for heating the temperature control medium in the tank 17
cooling means 19 for cooling the temperature control medium in the tank 17
optionally a temperature sensor 4, and
a regulating or control device 1.

The invention claimed is:

1. A temperature control device for a shaping tool or component of a shaping working machine, the temperature control device comprising:
two temperature control branches connected to a feed;
two throttle devices respectively provided in the two temperature control branches;
a pump system including a pump for the delivery of temperature control medium in the feed;
a control or regulating device for regulating or controlling a delivery of the pump system; and
a sensor for detecting a parameter from a group of temperature, through-flow amount, and pressure,
wherein signals from the sensor are fed to the control or regulating device, and
wherein in at least one of the two temperature control branches, the throttle device provided therein is essentially completely open.

2. The temperature control device according to claim 1, wherein the two temperature control branches are connected in parallel.

3. The temperature control device according to claim 2, wherein each of the two temperature control branches includes a sensor for detecting a parameter from a group of temperature, through-flow amount, and pressure, wherein signals from the sensor included in each of the two temperature control branches are fed to the control or regulating device.

4. The temperature control device according to claim 1, wherein the control or regulating device regulates or controls the delivery of the pump system by controlling or regulating the rotary speed of the pump.

5. The temperature control device according to claim 1, wherein the control or regulating device regulates or controls the delivery of the pump system by shutting down or switching on the pump.

6. The temperature control device according to claim 1, wherein the temperature control device is an accessory device for the shaping working machine.

7. A shaping working machine having the temperature control device according to claim 1.

8. An arrangement comprising two shaping working machines and the temperature control device according to claim 1, wherein the shaping tools of the two shaping working machines can be temperature-controlled by the temperature control device in a serial or a parallel relationship.

9. The shaping working machine according to claim 7, wherein the shaping working machine is an injection moulding machine, a die casting machine or a pressing machine.

* * * * *